United States Patent
Alton

(10) Patent No.: US 9,639,558 B2
(45) Date of Patent: May 2, 2017

(54) IMAGE BUILDING

(71) Applicant: INTERNATIONAL BUSINESS MACHINES CORPORATION, Armonk, NY (US)

(72) Inventor: Benjamin P. Alton, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 14/857,162

(22) Filed: Sep. 17, 2015

(65) Prior Publication Data

US 2017/0083544 A1 Mar. 23, 2017

(51) Int. Cl.
G06K 9/54 (2006.01)
G06K 9/60 (2006.01)
G06F 17/30 (2006.01)

(52) U.S. Cl.
CPC .. G06F 17/30265 (2013.01); G06F 17/30109 (2013.01)

(58) Field of Classification Search
CPC ............... G06F 17/30265; G06F 17/30109
See application file for complete search history.

(56) References Cited

U.S. PATENT DOCUMENTS

2003/0236927 A1 12/2003 Cleraux et al.
2010/0054601 A1* 3/2010 Anbalagan ........ G06F 17/30265
382/180
2012/0070045 A1 3/2012 Vesper et al.
2015/0120760 A1 4/2015 Wang et al.
2016/0070554 A1* 3/2016 Lewis ................... G06F 9/4401
713/2

FOREIGN PATENT DOCUMENTS

WO WO2015049233 A1 4/2015

OTHER PUBLICATIONS

"Building Docker Images—Project Atomic," http://www.projectatomic.io/docs/docker-building-images/, downloaded from internet May 20, 2015, pp. 1-6.
"How to Build and Deploy Docker Images with Drone," http:/paislee.io/how-to-build-and-deploy-docker-images-with-drone/, downloaded from internet May 21, 2015, pp. 1-25.
Minnihan, John, "Understanding the Docker Cache for Faster Builds," http://thenewstack.io/understanding-the-docker-cache-for-faster-builds/, downloaded from internet May 20, 2015, pp. 1-5.
Cardwell, Travis, "Docker Update Tag Conventions," Feb. 7, 2014, pp. 1-3.
"Create Multiple Tag Docker Image," http://stackeroverflow.com/questions/21928980/create-multiple-tag-docker-image, downloaded from internet Sep. 10, 2015, pp. 1-2.

* cited by examiner

*Primary Examiner* — Phuoc Tran
(74) *Attorney, Agent, or Firm* — Richard Wilhelm, Esq.; Blanche E. Schiller, Esq.; Heslin Rothenberg Farley & Mesiti P.C.

(57) ABSTRACT

An image is built. The building of an image includes selecting an image to be built, performing a hashing function on the image to produce a checksum, querying a registry for an existing image including the same checksum, and if no existing image including the same checksum is found, acquiring a parent image for the image to be built, building the image to produce a built image, adding the checksum for the image to the built image, and storing the built image in the registry.

15 Claims, 8 Drawing Sheets

IMAGE BUILDING

BACKGROUND

One or more aspects of the present invention relate to building an image, and in particular to, reducing the time taken to build, upload and download images in a computing environment.

Docker is an open-source project that allows users to package software applications into a software container (see www.docker.com for more information). These containers can be deployed onto any machine that runs Docker and are abstracted from the host hardware and operating system. While a similar concept, Docker does not use virtual machines, but does use virtualization.

A Docker image is a read-only template. For example, an image could contain an Ubuntu operating system with Apache and a web application installed. Images are used to create Docker containers. Docker provides a simple way to build new images, and Docker images that other people have already created can be downloaded. Docker images are the build component of Docker. Docker registries hold images. These are public or private stores from which images can be uploaded or downloaded. A public Docker registry is called a Docker Hub that provides access to a huge collection of existing images. Docker registries are the distribution component of Docker. Docker containers are similar to a directory. A Docker container holds everything that is needed for an application to run. Each container is created from a Docker image. Docker containers can be run, started, stopped, moved, and deleted. Each container is an isolated application platform. Docker containers are the run component of Docker.

To deploy a simple application using Docker, a user is expected to create a directory and, inside the directory, create a Dockerfile (a text file with the name "Dockerfile"). In the Dockerfile, the user describes what they want to include in the software container that they would like to run. The user then runs a "docker build" command, which will examine the directory specified and the Dockerfile contained therein and build a Docker image. The user then runs a "docker run" command, which will create a Docker container that can run anything that has been specified in the Dockerfile.

Docker images are essentially blueprints and can be considered as models that describe what a Docker container should look like, at least when the container is first started. A Docker container is a running instantiation of an image, essentially a working version of an image. A Docker system will know and will be able to display an image on which a container is based.

In the deployment process mentioned above, a user can use a Dockerfile to describe what the user wants the image to contain; however, there are different ways of achieving this effect. For example, in a Dockerfile, the first meaningful component will be a "FROM" line. This line describes on what the new image will be building on top. When a user is creating a new image, they need to specify a base image from which the new image will extend. The base image (the image from which the new image is extending) can be referred to as a parent image and the new image (the image that the user is writing and the image that is extending from the parent) can be referred to as a child image.

In a Docker system, if a user wishes to build a new image, they must have a parent and that parent must exist and be available on a local system when a child is being built. On the same principal, another way to use the Dockerfile to describe what to run is to add/copy files into the image. Any file that is available in the image directory that contains the Dockerfile can be added to the new Docker image, provided the Dockerfile explicitly states to include the file. A user can also run commands when building the image, for example, to install external dependencies, for example from the internet.

For simple Docker images, most users will be expected to extend from an operating system image such as Ubuntu or Centos. For more advanced cases, users will create entire trees of Docker images where a user can define an image that extends from another user-defined image and that image extends from a base image. An image can have any number of children, though every image must have at most one parent. Similarly, images can span any number of generations, an image can have a parent, that parent could have a parent, that image could have a parent and so on until eventually reaching a base image.

In larger architectures, development teams could be responsible for a large number of images. Under such usage, images can be expected to form a hierarchy or tree of images, as shown in FIG. 1. The tree 10 is made up of images 12, with each arrow 14 indicating a parent-child relationship. When a user builds an image, the Docker system will generate a UUID (Universally Unique IDentifier) and assign the UUID to the newly generated image. These UUIDs are 64 characters long consisting of hexadecimal digits, using the numbers 0 to 9 and the letters a to f and being case insensitive. As the name implies, the UUID that the Docker system provides will be different even if the image that was built was exactly the same as another image. When a user starts a container, the user needs to inform the Docker system which image from which the user wishes to build the container and one way to do this is using the image UUID.

Images can also have aliases in the form of name and tag combinations that are separated by a colon. For example an alias could be "ubuntu: 14.04", where the name of the image is "ubuntu", referring to the operating system, and the tag is "14.04", referring to the specific version of Ubuntu in the image. Users can expect a single name across many images, but each will have a different tag to identify a specific version, the time the image was built or a feature-set. These aliases are user-defined, but typically concisely describe the image's contents. In the Docker system, an image alias must always resolve to one specific image using the UUID.

Aliases are more user-friendly ways of interacting with Docker images. A user can start a container by passing in an image alias instead of the image UUID and similarly, most Docker commands will accept image aliases. For example, a user can use an alias to a specific image and create a container of that image. The "FROM" specification in a Dockerfile can refer to the parent image by an alias. If a tag is not specified in an alias, the tag will be set to "latest". For example, a user that makes an image alias of "hello" would actually be creating an alias of "hello:latest", although the Docker system will accept "hello" as an alias and resolve the alias to the correct image UUID. An image can have any number of aliases. If an image has zero aliases, then a user will always need to use the UUID to refer to the specific image. Otherwise, any alias can be used and they will all point to a specific image. Aliases can be assigned at any time, as long as the image to which the alias points does exist.

Images can be shared using a Docker registry. Such a registry is a web-based repository where images can be uploaded and downloaded. In order to share an image between two distinct machines, one machine must upload the image to the registry and another machine must download the image from the same registry. The concept of aliases discussed above also extends to registries in that an image stored in a registry can be identified by an alias and hence can be uploaded and downloaded with a user-friendly name. Similarly, a registry exposes a way to give an existing image that was previously uploaded to the registry a new alias. As images are written to a storage device of some kind, there will be a physical limit to the number of images a registry can hold.

Downloading of an image also requires the downloading of the image's parent and that image's parent and so on until a user downloads a base image, which will usually be an image of an operating system. Similarly, uploading an image to the registry will also mean uploading the images from which the image extends. When downloading images from a registry, Docker will skip the downloading of images already present on the local system. For example, if a user downloads a specific image and then tries to download the same image again at a later date, then the second download operation would be skipped. This also applies to image parents. If a user downloads a new image, but already has the parent of the image stored locally, the user will only download the new image, since Docker will only download images that are not present locally. Similarly, uploading an image to a registry will only upload an image that is not already present on the registry. This download/upload skipping works based on the image UUID. If a user gives an image a specific alias and then tries to download an image of the same alias, the user might download an entirely new image, and the parents, if the image UUIDs do not match.

Image based systems such as Docker can be used in a computing environment, which comprises an architecture or a number of computers that run(s) Docker containers after downloading the relevant images. For example, an environment could run three containers, including a web server, a database back-end and a monitor that will keep testing the web server and, by extension, the database that the web server relies upon. There may be several parallel environments with, for example, one for each developer and any number of the environments could be being deployed at the same time. Although the easiest way to share images is via a registry, having a registry per environment may be too costly and a single set of images may be deployed to multiple environments. For simplicity, the environment is given a build label and downloads the relevant images by name and tag, where the tag is the build label. Images are available at the registry at the time they are deployed in an environment.

The simplest approach is to have a build process that simply builds all the images in parent-first order and uploads each to a repository, with the tag set to the current build time. FIG. 2 illustrates this process. A unique identifier is set for the build so that when images are shared on the registry, an environment can download the correct images by this identifier. This identifier is referred to as the build label and is set in step S2.1 of the process detailed in FIG. 2. At step S2.2 there is provided a list of images to be built. In order to build a Docker image, as discussed above, the parent image must be present. Therefore, at step S2.3 the images to be built are sorted so that parents are built before children, although the order of a single image's children is irrelevant.

After an ordered list of images to be built has been generated, a first image to be built is selected at step S2.4 and the image is built at step S2.5 and uploaded to the shared registry at step S2.6. In step S2.6 the tag of each image is set to the current build label so that the environment can download the correct images. This process is repeated through the checking steps S2.7 and S2.8 until all images have been built. Once the process has run out of images to build, then the built images can be deployed to the environment, i.e. all of the images are ready to be downloaded.

In developer teams with a large number of team members and a large enough image hierarchy, having each developer build and transfer their own images leads to unnecessary duplication and stress on the shared registry. Each developer would be storing their entire hierarchy of images on the registry every time they build. Any developer could choose to build only the relevant images, but for a large enough hierarchy, selecting what needs to be re-built would become tedious and time consuming. This could also lead to deployment-side issues, as the script that downloads the images needs to handle only some images to be downloaded.

Unfortunately, each new Docker image that is created will generate a UUID, even with the same directory structure on the same machine at different times or on two machines at the same time. Services such as Docker do not notice that two identical images have been created and/or uploaded to the registry. Docker uses a local cache for building images on a machine. Upon building a new image, if the image that would be built already exists (for example since the image was built earlier), Docker will simply use the locally cached image instead. However, this will only be available to the local system; two distinct machines could not exploit the same cache easily and unnecessary duplication will occur.

Furthermore, if a developer wished to exploit the Docker local cache, the developer would need to keep all of the images on their local system, which may cause issues if the image hierarchy is large enough and the machine's local storage disk size is not capable of holding many versions of the images. In the interests of available disk space, many build processes will wipe any existing artifacts (including images) before anything is built.

SUMMARY

In one aspect, a computer-implemented method is provided. The computer-implemented method includes selecting, by a processor, an image to be built; performing a hashing function on the image to produce a checksum; querying a registry for an existing image including a same checksum; and based on no existing image including the same checksum being found: acquiring a parent image for the image to be built; building the image to produce a built image; adding the checksum for the image to the built image; and storing the built image in the registry.

In another aspect, a computer system is provided. The computer system includes a memory; and a processor in communication with the memory, wherein the computer system is configured to perform a method. The method includes selecting, by the processor, an image to be built; performing a hashing function on the image to produce a checksum; querying a registry for an existing image including a same checksum; and based on no existing image including the same checksum being found: acquiring a parent image for the image to be built; building the image to produce a built image; adding the checksum for the image to the built image; and storing the built image in the registry.

In another aspect, a computer program product is provided. The computer program product includes a computer readable storage medium readable by a processing circuit and storing instructions for execution by the processing circuit for performing a method. The method includes selecting, by a processor, an image to be built; performing a hashing function on the image to produce a checksum; querying a registry for an existing image including a same checksum; and based on no existing image including the same checksum being found: acquiring a parent image for the image to be built; building the image to produce a built image; adding the checksum for the image to the built image; and storing the built image in the registry.

BRIEF DESCRIPTION OF THE DRAWINGS

Embodiments of the present invention will now be described, by way of example only, with reference to the following drawings, in which:—

DETAILED DESCRIPTION

Figure 3:
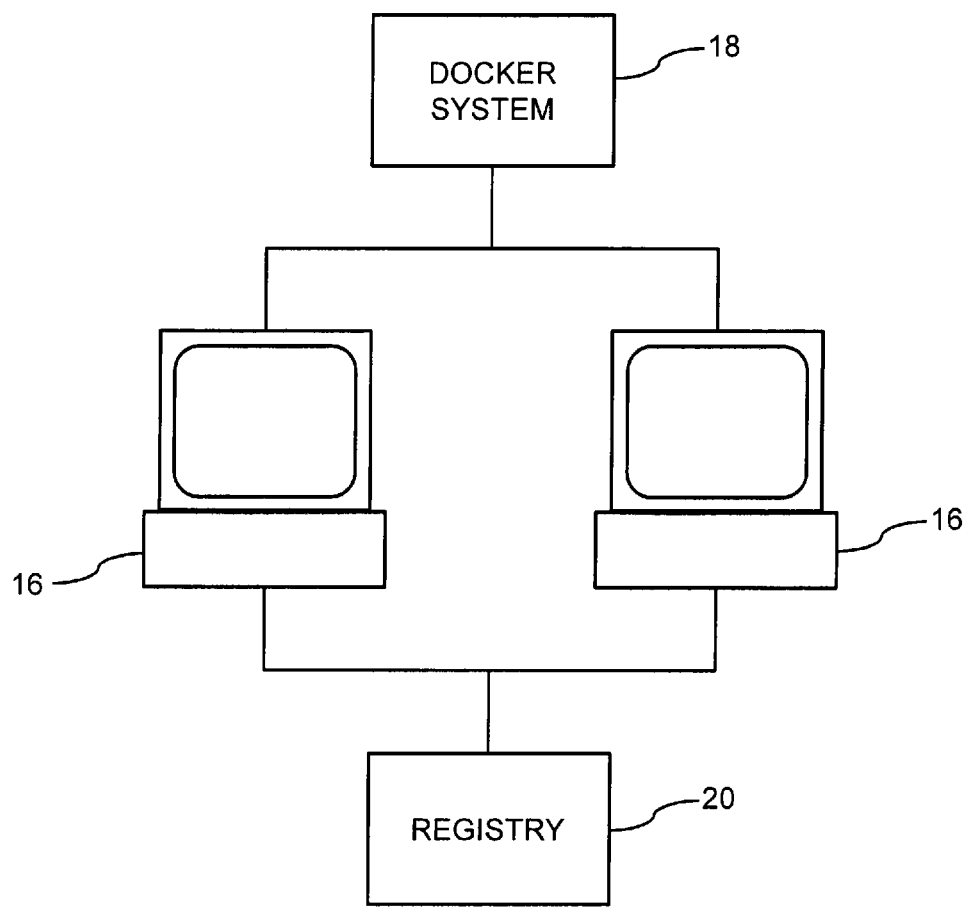
FIG. 3 is one example of a schematic diagram of a set of computing environments connecting to an image building system and to a local registry.

FIG. 3, in one example, illustrates schematically two client devices 16 connected to a Docker system 18 and to a local registry 20. The registry 20 stores images that have been built using the Docker system 18 (although the building process takes place on a client device 16). Each client device 16 can be considered to be a processing environment that is being used by a developer as part of a development team. The registry 20 is shared in the sense that all developers (and environments) can access the registry 20, not that the registry 20 is necessarily publicly available. A private Docker registry 20 can be deployed that is accessible only to the development team, but is still considered to be a shared resource.

Figure 1:
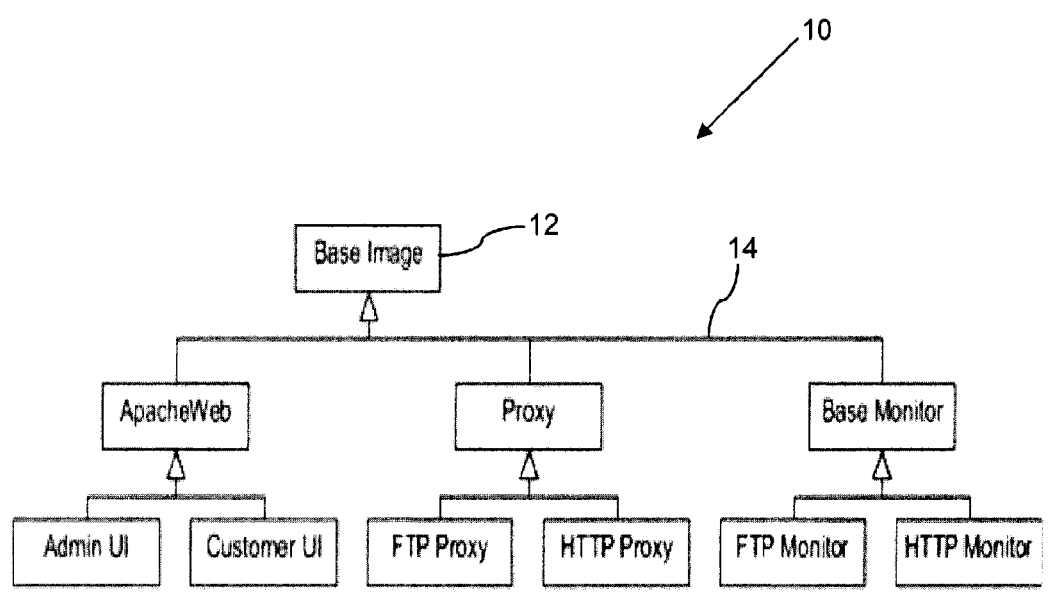
FIG. 1 is a diagram of a hierarchy of images.
Figure 2:
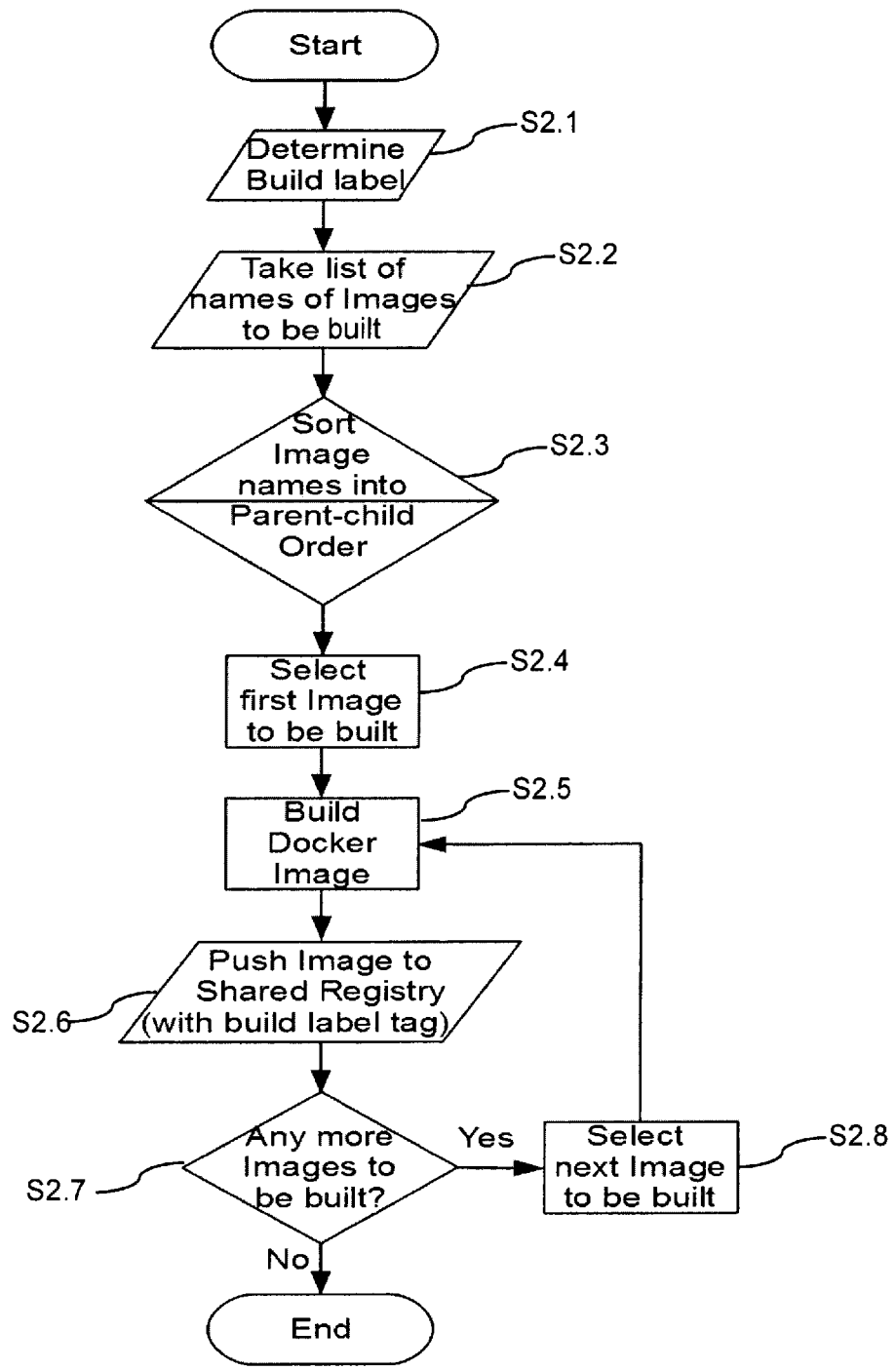
FIG. 2 is a flowchart of a process of building a series of images.
Figure 4:
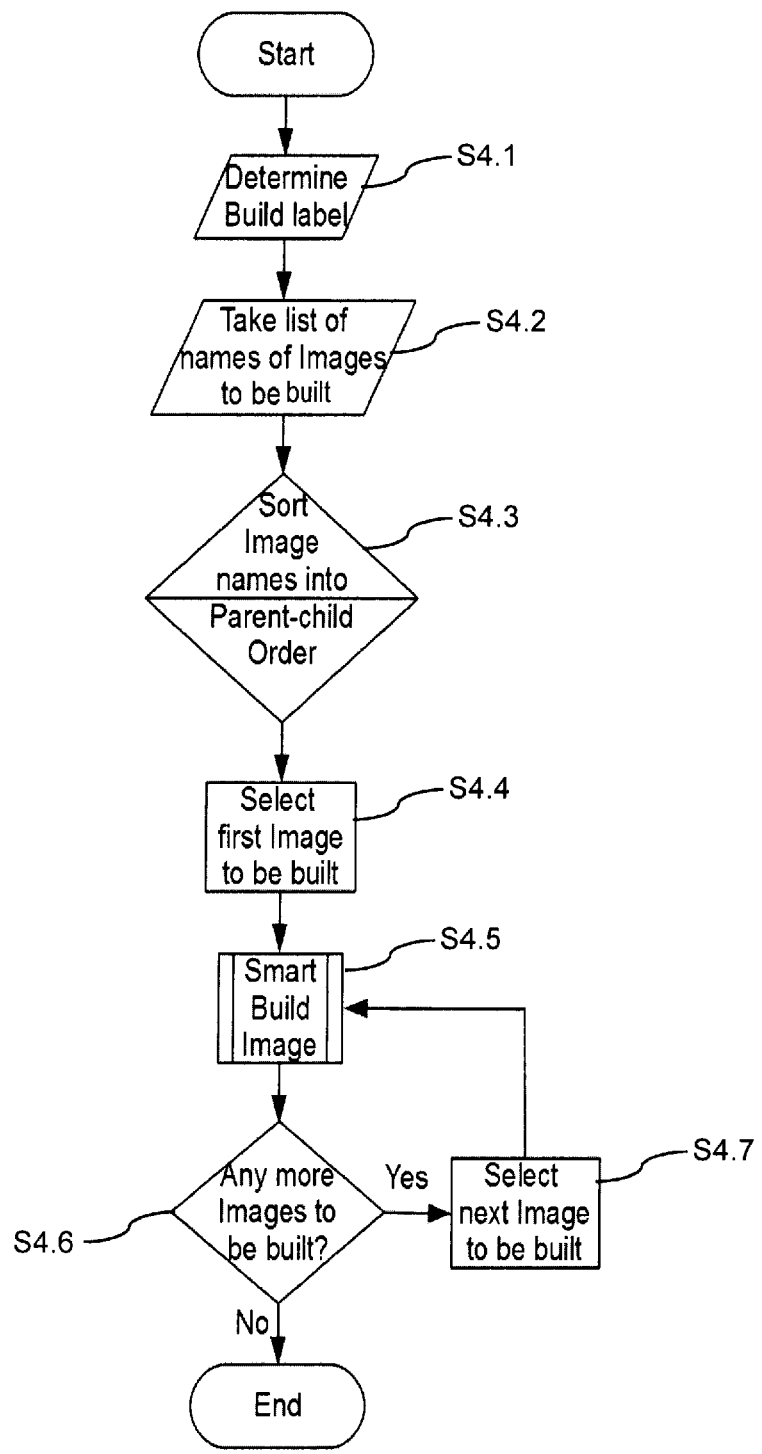
FIG. 4 is one example of a flowchart of an improved process of building a series of images.

The operation of the client devices 16 is configured to provide a new approach to building Docker images so that individual images that are not modified are not re-built. One concept that is used is that Docker images can have multiple aliases and that aliases can be added at any time after an image is created. Before going into the detail of building individual images, the flowchart of FIG. 4 defines how to build the entire image tree which includes the hierarchy of images. This flowchart is similar to the steps defined with respect to FIG. 2 above (e.g., steps S4.1-S4.4 and S4.6-S4.7 are similar to steps S2.1-S2.4 and S2.7-S2.8), but in place of the build and upload steps S2.5 and S2.6, there is defined a new sub-process at step S4.5, which is called "Smart Build Image". This sub-process is further described in the flowchart of FIG. 5.

Figure 5:
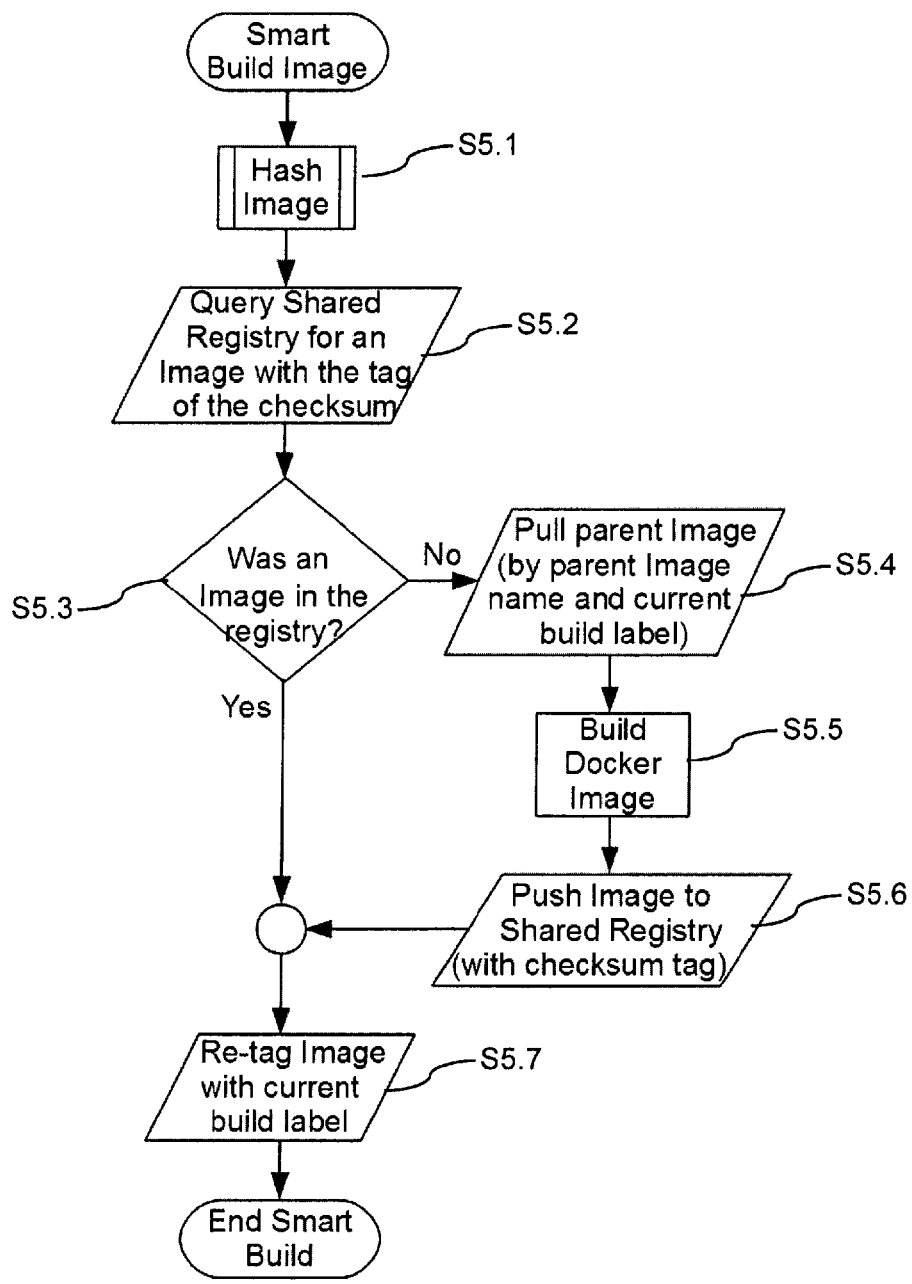
FIG. 5 is one example of a flowchart of a smart build process.

The flowchart of FIG. 5 shows one embodiment of a method of how to build an image in the smart build approach. For every image to be built according to the step S4.5 of FIG. 4, this sub-process will be performed. In this smart build process, the name of the image to be built and the build label are available. The first step of the method is step S5.1 which comprises hashing the image. There are many different well-known hashing functions available and the choice of a hashing function is an implementation decision. In this embodiment of the process, the hashing algorithm SHA-1 is used on the image alone. After this hashing step S5.1, there is available a checksum or a hash of the image that is being built.

At step S5.2 of the process a query is made to the shared registry 20 for an image of the relevant name that has a tag of the generated checksum. At step S5.3 a check is made and if there is no match, then this specific image has not been built yet and so it is to be built, proceeding to step S5.4. If there is a match, then the method proceeds to step S5.7, discussed in detail below. In order to build the image, at step S5.4, the parent image from which the image in question extends is acquired. Because of the order that images were sorted in step S4.3 (parent first), the parent image is downloaded from the registry 20 by searching for the parent image name with the tag set to the current build label. With the parent available, then at step S5.5 the Docker image is built.

Next, at step S5.6 the image is shared by uploading the image to the registry 20. The image is added to the registry 20 with the tag set to the checksum generated in step S5.1. At this point, regardless of whether the current pass of the flowchart built the image or not, there will be an image of the specific name and a tag of the checksum in the registry 20. At step S5.7, there is assigned a new alias to this image with the tag set to the build label. This ensures that even if the required image is not built from scratch since the image already exists, as detected by matching the checksum, the image will have the correct build label added to the image as an alias.

When the environment is deployed, the machine in question will still be able to download an image by its name and the build label. The only difference, as far as the environment is concerned at this point, is that the image may now have multiple aliases. The image will have at least two aliases; one will have a checksum as a tag and at least one build label tag. As a result of re-using the same image in the build process, the download of unmodified images will be skipped thereby saving network usage and time.

Similarly, when the process moves onto the building of any children of the image, the process can pull its parent by the build label. The only exception to this is with base images such as Ubuntu or Centos since they should be downloaded with the correct tag as specified in the child image, not the build label. If an image does not change, the process does not need to download the image's parent, build the image or upload the image to the registry. As a result of this adaptation in the build process when the checksum aligns with an existing image this leads to a reduced build time, lower network utilization and less storage space is used on both the registry 20 as the registry 20 only holds the image once, even if the image has multiple names, and on the machine performing the building process.

If the smart build process is not used, then the Docker registry can be expected to have many images, each with a single alias. In the improved approach, the registry 20 will have fewer images each with many aliases, where the number of aliases will depend on how often the image has changed. As the registry 20 will be storing fewer images, the storage space required will be reduced and/or the registry 20 will not need to be cleared as frequently. The very slight increase in space used by multiple aliases is dwarfed by the reduction in the number of images required to be stored and the reduction in network and processing resources required to be used since the amount of image building is reduced, when the smart build process is used.

This approach can support multiple developers using the same registry 20, and actually becomes better if they do. If any developer modifies an image and goes to test the image in an environment, that developer builds the image and any children images and generates the new checksum tag. As the checksum is different, no other developer will notice the recently-modified image, including children images. So, the developer testing a new image will not affect other developers in this scenario.

However, if the developer then shares their changes with their team, other developers using the same build process will generate the same checksum as was made in the initial developer's test. As a result, the developer that tests a new/modified image will be building that image for the whole team and similarly, the children images will be built and shared as well. This can potentially lead to developers becoming oblivious to other developers' contributions at least when deploying to their environments. However, if a developer modifies an image and another modifies a child of that image even indirectly that child image will be re-built.

Figure 6:
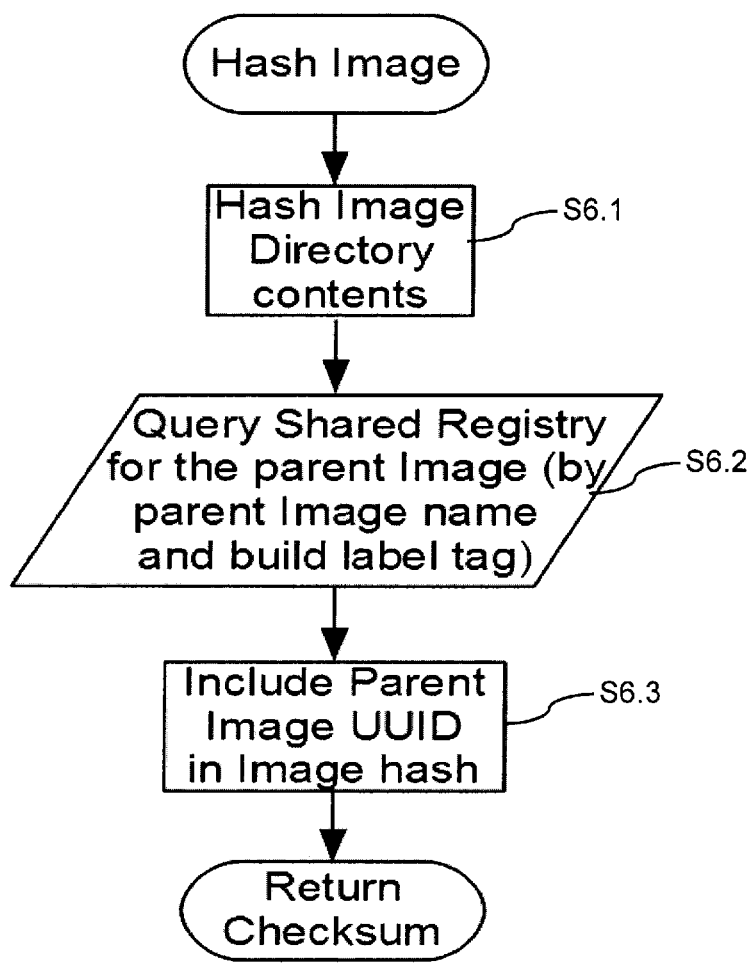
FIG. 6 is one example of a flowchart of an image hashing process.

The flowchart of FIG. 6 shows another embodiment of the Hash Image sub-process (step S5.1) used in the Smart Build Image process of FIG. 5. The exact flow of the process and any further additions to the process are subject to the specific implementation. For this process, the computing environment carrying out the hashing process is provided with an image name, and therefore, with the name the environment is able to see the image directory and read the Dockerfile to determine the parent image.

At step S6.1, the process hashes the contents of the image directory including the Dockerfile. In this embodiment, the hashing algorithm is an MD5 checksum on the content of all of the files within the image directory and the directory structure itself. Ideally, the checksum will only be affected by things that make a functional difference in the image, and therefore, two functionally-identical images should generate the same checksum. The process can terminate at this point.

In yet another embodiment of the process, the parent image ID is also included in the hash, because changes in parent images are possible to detect and this image can be rebuilt as a result. If a parent image changes for example, the children of the parent image are highly likely to behave differently. For example; if a parent image includes installing a new security patch, then all its children should also include that patch. The environment can determine the parent image ID by querying the registry 20 at step S6.2 for the parent image name and the build label as a tag, unless the parent is a base image where the specified tag is used instead). As mentioned previously, the order of the images to be built will guarantee that when the environment hashes an image, the parent will already be in the shared registry 20.

At step S6.3, the parent image UUID is included in the image hash. This can be achieved, for example, by hashing the ID as raw text into the checksum. Since new images will only be built infrequently, the parent image ID will often be the same across multiple runs of the build process. The only reason an image should be re-built is if the image's content has changed or the parent from which the image is extended has changed.

Figure 7:
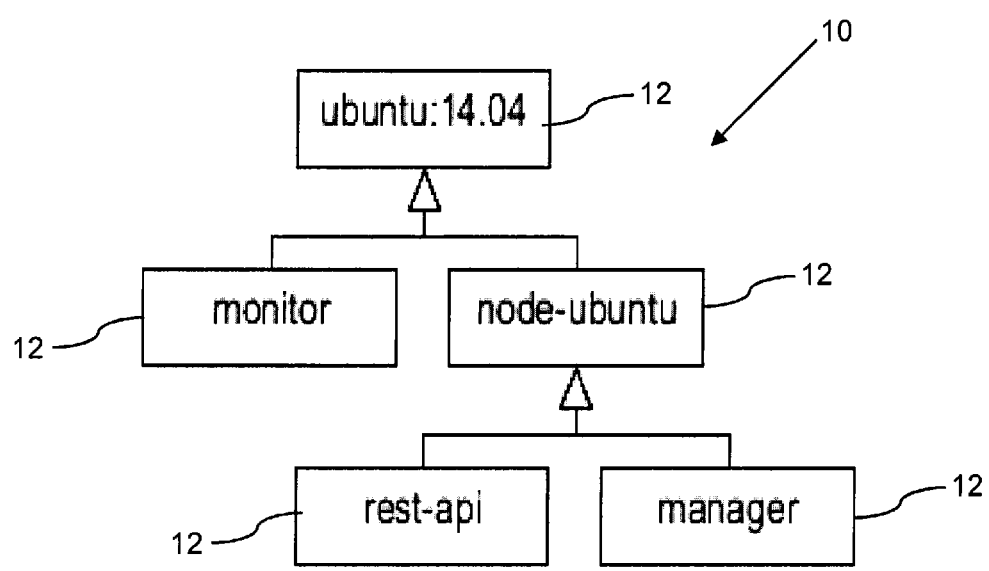
FIG. 7 is one example of a further diagram of a hierarchy of images.

FIG. 7 shows a simple example hierarchy 10 using four different images 12. The description below illustrates how the intelligent build process can be used with respect to the hierarchy 10 shown in this Figure. In this example UUIDs and tags are given more memorable and understandable names to simplify the example purely for purposes of understanding since image UUIDs are typically hexadecimal strings at least 64 characters long. In this example, the current build label will resolve to the current date in a shortened ISO format and the checksum algorithm used is an MD5 checksum of the directory structure, the directory files' contents and the parent image ID.

In this example hierarchy 10, the topmost image 12 labelled "ubuntu:14.04" is a base image and is an externally downloaded Docker image available from Docker's public registry. Two child images 12 labelled "node-ubuntu" and "monitor" extend from the specifically tagged version of the Ubuntu image, and two further child images 12 labelled "rest-api" and "manager" extend from "node-ubuntu" image 12. No explicitly defined version of these images 12 is used, but the images extend from the "node-ubuntu" image that has been built by this process. The order in which these images are built is largely unimportant, as long as "node-ubuntu" is built before both the "rest-api" and "manager" images, since these two images are children of the "node-ubuntu" image. For the purposes of this example, the images will be built in the following order; "node-ubuntu", "rest-api", "manager" and "monitor".

Initially, there are no images in the shared Docker registry 20. A developer runs through a new build process with a build label of "20150126". A build engine present on the developer's environment can resolve the Docker public registry to download the "ubuntu: 14.04" image and ascertain the image ID of this base image. The build engine first builds the "node-ubuntu", which is a simple extension of Ubuntu that installs NodeJS, a standalone JavaScript runtime environment. On its own, this image is useless, since a container of this image would not run anything useful, but this image acts as a common parent to a pair of useful child images. The build engine generates a checksum of the Dockerfile (there are no other files in the image directory) and includes the parent image ID. The checksum generated on this run is CSNU01 (this is intended as a readable version of the checksum for reasons of simplicity of explanation).

At this point, the build engine queries the registry 20 for an image with the alias: node-ubuntu:CSNU01. As the registry 20 is empty at this point, the build engine does not find a matching image and thus the build engine builds the image and Docker provides the image with a UUID of NU_Image1 (again simplified for clarity purposes). The build engine pushes the Docker image to the registry 20 with the alias: node-ubuntu:CSNU01. Next, the build engine re-tags this image with the new build label, giving an alias of: node-ubuntu:20150126.

The build engine next moves on to the "rest-api" image which will install some specific NPM packages and will include a few JavaScript files in the image directory that contain the business logic for a RESTful interface. The build engine determines the parent image name by reading the Dockerfile as "node-ubuntu" and then the build engine searches the registry 20 for an image with the alias: node-ubuntu:20150126. As this was just uploaded, the registry 20 provides the image ID as: NU_Image1.

The build engine hashes the parent image ID and the image directory and, as the registry 20 is still mostly empty, detects that the build engine has a new image to build. The build engine builds the image with the UUID of: RS_Image1. The checksum generated is: CSRS01. The build engine pushes the new image to the registry 20 with the checksum tag and then re-tags the stored image with the build label. The build engine performs a similar process for the "manager" image. The build engine creates an image with the UUID: MA_Image1 and the build engine generates the checksum: CSMA01. The registry 20 is updated with the new image and both aliases. Next, the build engine builds the "monitor" image, which includes some software to test if the REST API is running. As before, the build engine needs to build the image as no similar image currently exists in the registry 20. The build engine creates an image with the UUID: MO_Image1 and the build engine generates the checksum: CSMO01. At the end of the first run-through, the registry 20 will have four images (ignoring the base image ubuntu: 14.04), each with two aliases each:

NU_Image1—node-ubuntu:CSNU01, node-ubuntu:20150126

RS_Image1—rest-api:CSRS01, rest-api:20150126

MA_Image1—manager:CSMA01, manager:20150126

MO_Image1—monitor:CSMO01, monitor:20150126

In the environment, the build engine can download the "rest-api", "monitor" and "manager" images by the build label (20150126). The "node-ubuntu" image is not explicitly downloaded (but will be included when downloading the "rest-api" and "manager" images) as this image on its own does not serve any purpose to the environment.

Although the above process contains no obvious efficiencies when compared to a conventional image build process, the use of the aliases in this way sets up the registry and the users of the registry to create efficiencies in respect of future build actions. For example, on the next run-through, a developer modifies the "manager" image to install an extra database package. The new build label is "20150127". The build process is now operated as follows:

The build engine hashes the "node-ubuntu" image including the directory and the parent image ID. The checksum generated is: node-ubuntu:CSNU01. The build engine queries the registry 20 and finds an image with that alias already in existence: NU_Image1. The build engine does not need to build or push anything new to the registry 20, the build engine re-tags the Docker image "NU_Image1" with the current build label, creating a new image alias: node-ubuntu:20150127. Next, the build engine wants to build the "rest-api" image. The build engine determines the parent is "node-ubuntu" and queries the registry 20 for the image ID, thereby searching for an image with the alias: node-ubuntu:20150127 and, as the build engine just re-tagged this image, the build engine receives the image ID: NU_Image1.

The build engine uses this image ID and the "rest-api" image directory to generate the hash: CSRS01. As before, the build engine finds an image with the alias rest-api:CSRS01 which is the image with the UUID: RS_Image1. The build engine re-tags "RS_Image1" with the current build label and forms a new alias: rest-api: 20150127. At this point the build engine is to build the modified "manager" image. As before, the build engine picks the parent image ID and then the build engine hashes the image directory. As the directory includes new content, the checksum generated is different: CSMA02. The build engine queries the registry 20 for an image with the alias manager:CSMA02 and finds nothing. The build engine therefore downloads the parent image ("node-ubuntu:20150127"), builds the new image, pushes the newly built image to the registry 20 with the checksum tag and then re-tags the new image with the build label. The next image has the UUID: MA_Image2. The build engine builds the "monitor" image following the same procedure. After this, the registry 20 now contains five images:

NU_Image1—node-ubuntu:CSNU01, node-ubuntu:20150126, node-ubuntu:20150127

RS_Image1—rest-api:CSRS01, rest-api:20150126, rest-api:20150127

MA_Image1—manager:CSMA01, manager:20150126

MA_Image2—manager:CSMA02, manager:20150127

MO_Image1—monitor:CSMO01, monitor:20150126, monitor:20150127

As can be seen from the above, in this example, only the actual image "manager" needed to be rebuilt and all the other images were just retagged with the additional alias to show that they belong to the current build. A large amount of processing and data traffic has been saved in this way, when compared to the process of rebuilding the entire set of images. In a test environment, the images with the tag 20150127 are deployed. Because the images for "rest-api" and "monitor" were not changed, there is no need to download them. Whilst the test environment will need to download a new version of the "manager" image, the parent image ("node-ubuntu") does not need to be downloaded since this image is unchanged since the last deployment.

To further illustrate the system working, consider a change has occurred to the "node-ubuntu" image's Dockerfile to update one of the NPM packages (a package manager for JavaScript) to a new version. The new build label is "20150128". As always, the build engine starts with the "node-ubuntu" image and hashes the parent image UUID and the recently modified directory contents. The build engine generates the checksum: CSNU02. The build engine queries the registry 20 for this tag (with "node-ubuntu" as the name) and finds nothing. The build engine then downloads the parent for the image, builds the image, generating the image UUID of "NU_Image2", and uploads this new file to the registry 20 along with two aliases; node-ubuntu:CSNU02 and node-ubuntu:20150128.

Next, the build engine handles the "rest-api" image. The build engine searches for the parent image "node-ubuntu:20150128" and gets the parent image ID of "NU_Image2". The build engine hashes this ID and the "rest-api" image directory and gets the checksum of "CSRS02". In this case, the parent image was changed even though the current image's contents have not.

The build engine queries for an image with the name "rest-api" and the tag "CSRS02" and finds nothing. Therefore, the build engine builds the "rest-api" image. At this stage, the build engine should first pull the parent image, but the build engine already has the image, so no new image will be downloaded, and gets an image UUID of "RS_Image2". The build engine uploads the "RS_Image2" image to the registry 20 and tags the image both as "CSRS02" and "20150128". The build engine performs a similar procedure for the "manager" image, generating an image with the UUID of "MA_Image3" and the two aliases: manager:CSMA03 and manager:20150128. Nothing has changed in the "monitor" image and the build engine simply re-tags the "MO_Image1" with the new label "20150128". At the end of this run-through, the Docker registry 20 will now look like this:

NU_Image1—node-ubuntu:CSNU01, node-ubuntu:20150126, node-ubuntu:20150127

NU_Image2—node-ubuntu:CSNU02, node-ubuntu:20150128

RS_Image1—rest-api:CSRS01, rest-api:20150126, rest-api:20150127

RS_Image2—rest-api:CSRS02, rest-api:20150128

MA_Image1—manager:CSMA01, manager:20150126

MA_Image2—manager:CSMA02, manager:20150127

MA_Image3—manager:CSMA03, manager:20150128

MO_Image1—monitor:CSMO01, monitor:20150126, monitor:20150127, monitor:20150128

On the deployment side of things, a test environment will need to download completely new images for "rest-api" and "manager", including a new version of "node-ubuntu", but the test environment can skip downloading the "monitor" image.

The improved methodology also provides for container re-use as an extra benefit from the intelligent build process. This allows Docker containers to be intelligently re-deployed based on whether a new image is actually downloaded. In this scenario, if an environment is to be re-deployed with the latest set of images, a message can be sent to the environment with a current build label and the environment can run a script that will download the images with the build label as a tag. There is no need to delete all existing containers and images and then download the new images.

In the improved approach, the environment should not delete images unless they are different, based on the Docker image UUID, from the images that are trying to be downloaded. Alternatively, the script could download the new images and delete any image that is not equivalent according to whether the image has the same UUID as the newly downloaded image.

On the same principle, the environment could delay the deletion of Docker containers until after the environment detects an image change. If the image that the environment has downloaded is equivalent to the image that a Docker container is already running, that container may not need to be stopped and deleted. This allows individual components to be available despite the node being re-deployed. In some implementations, this feature may not be desirable and this can be left for a system architect to decide.

To illustrate this feature, below is an example of how this can be achieved with respect to a system that includes a Docker registry containing intelligently built images created using the smart build approach detailed above and a machine currently running two Docker containers, which holds only two images, one for each container. In this example, the machine will have the "rest-api" and "manager" images and a container running for each of these images. The current and soon-to-be-expired build label that this machine is running on is "20150126" and a developer responsible for the machine wishes to update the build to "20150127".

The first step in the update process is for the machine to download the images with the aliases: rest-api:20150127 and manager:20150127. After doing so, there are now four images on the machine, however (for this example) the "rest-api" images are equivalent in that the aliases: rest-api:20150126 and rest-api:20150127 resolve to the same image. The first noticeable benefit is that the machine did not download a new "rest-api" image, though the machine may have downloaded the new aliases, saving the machine time and network usage.

At this stage, the machine wishes to remove any obsolete Docker images and containers. By listing the images on the machine, the developer can see the image UUID alongside each alias. Since the developer knows that the desired build label is "20150127", the machine can delete any image that is not equivalent to this label. The machine can start with the "manager" images which are not equivalent. Before the machine can delete any image, the machine needs to stop and remove all Docker containers that rely on that image, which is achievable since Docker provides a way to see from which image a container is built. This means deleting the currently running "manager" container and then creating a new container from the new image.

Next, the machine handles the "rest-api" image and the machine can resolve both aliases to the same image. In this arrangement, the "rest-api" container does not need to be deleted and re-created since the machine is still running the same code. The machine can maintain the availability of the "rest-api" container by not needlessly removing the container. In the cases of equivalent images, the machine can operate to clean up redundant aliases on the machine.

The smart build process described above utilizes a hash function to produce a checksum that is stored with an image as an alias, effectively metadata for the image. This delivers future efficiencies in both the building and deployment phases of software development, as the number of images that have to be built is reduced, network traffic is reduced and the requirements on the deployment side are also reduced as again local images that have been previously built can be reused. This approach becomes more beneficial as the size of a Docker image hierarchy increases (as more images need to be built), as the likelihood to build an image decreases, as network reliability/utilization decreases, as individual Docker images become larger, as the time spent building individual Docker images becomes longer, as the storage available for the registry becomes smaller, and as the number of people using the system increases.

Figure 8:
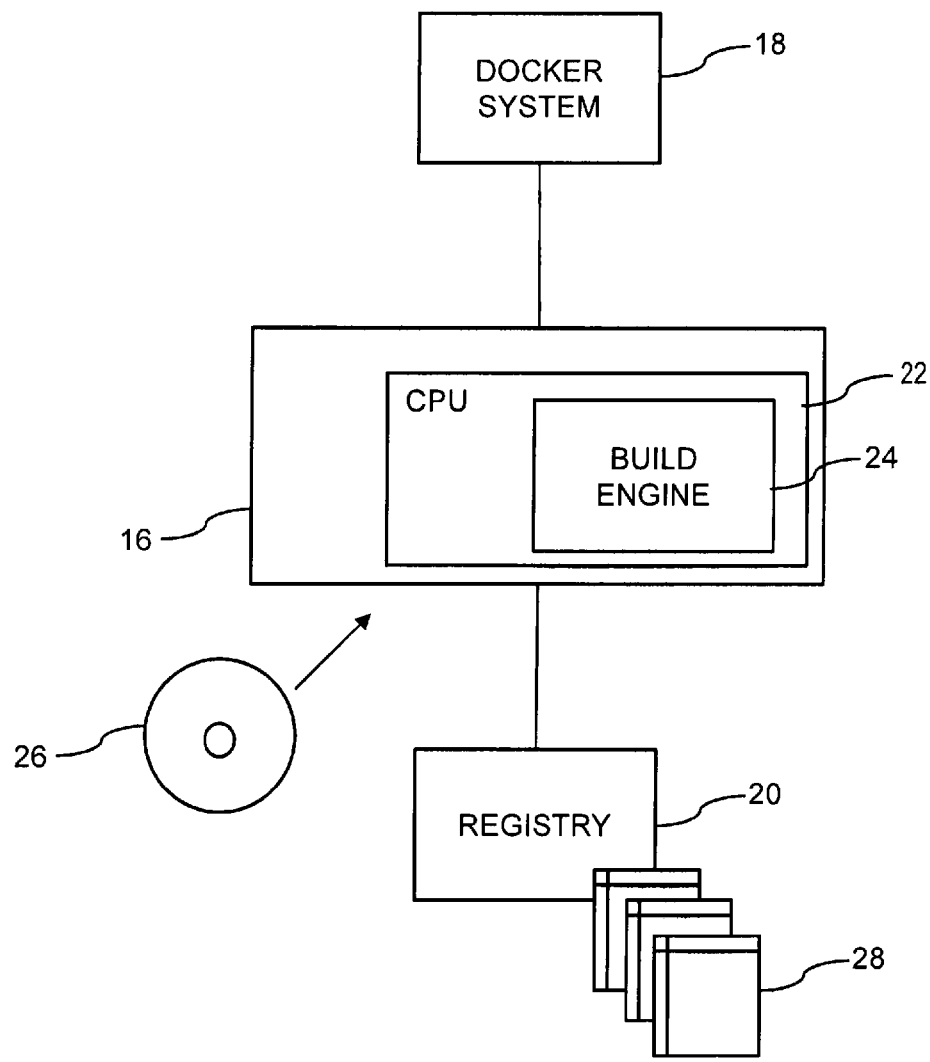
FIG. 8 is one example of a schematic diagram of a machine.

FIG. 8 shows more detail of a machine 16, which is connected to a Docker system 18 and to a registry 20. The machine 16 includes a processor 22 that is operating a build engine 24, which is executing the smart build process as described above. A computer program product is provided on a computer readable medium 26, which is a CD-ROM 26. The computer program product comprises a set of instructions that are used to control the processor 22, which is operating the build engine 24. The registry 20 stores images 28 that have been built, which can be subsequently deployed to environments to operate as the computing functionality provided by the specific images 28.

The build engine 24 operates by selecting an image to be built and performing a hashing function on the image to produce a checksum. The build engine 24 then queries the registry 20 for an existing image 28 including the same checksum, and if no existing image 28 including the same checksum is found, then the build engine 24 will continue the smart build process by acquiring a parent image for the image to be built, building the image to produce a built image, adding the checksum for the image to the built image, and storing the built image 28 in the registry 20.

As described herein, according to one aspect of the present invention, there is provided a computer implemented method comprising selecting an image to be built, performing a hashing function on the image to produce a checksum, querying a registry for an existing image including the same checksum, and if no existing image including the same checksum is found, acquiring a parent image for the image to be built, building the image to produce a built image, adding the checksum for the image to the built image, and storing the built image in the registry.

According to another aspect of the present invention, there is provided a system comprising a processor arranged to select an image to be built, perform a hashing function on the image to produce a checksum, query a registry for an existing image including the same checksum, and if no existing image including the same checksum is found, acquire a parent image for the image to be built, build the image to produce a built image, add the checksum for the image to the built image, and store the built image in the registry.

According to yet another aspect of the present invention, there is provided a computer program product for controlling a system, the computer program product comprising a computer readable storage medium having program instructions embodied therewith, the program instructions executable by a processor to cause the processor to select an image to be built, perform a hashing function on the image to produce a checksum, query a registry for an existing image including the same checksum, and if no existing image including the same checksum is found, acquire a parent image for the image to be built, build the image to produce a built image, add the checksum for the image to the built image, and store the built image in the registry.

Owing to an aspect of the invention if an image does not change, the process does not need to download the image's parent, build the image or upload the image to the registry. As a result of this adaptation in the build process, when the checksum aligns with an existing image, this leads to a reduced build time, lower network utilization and less storage space used on both the registry, as the registry only holds the image once, even if the specific image has multiple names, and on the machine performing the building process. As a result of re-using the same image in the build process, the download of unmodified images will be skipped thereby saving network usage and time. Both the build phase and the deployment phase of a software development cycle are made more efficient. Fewer resources are used and less network traffic is generated as a result of the smart build process.

In one embodiment, the method further comprises adding a build label for the image to the built image. Adding the current build label to an image after the image has been built allows any machine accessing the registry to ascertain those images that form the same build. Any image that is not built as the checksum identifies that the image already exists can also have the current build label added to the already existing image stored in the registry.

In a further embodiment, the method comprises receiving a set of images to be built, the set of images comprising a hierarchy of parent and child images where each child image has a single parent image, and ordering the set of images for processing such that each parent image is processed prior to the children of the respective parent image. In general, the build process will be performed over a plurality of images that are provided as a set of images. The sorting of the images into an order before any processing takes place ensures that child images are correctly built in that they will use the correct version of the parent image, since the parent image will be built before the child or children of that respective parent. In the hierarchy of parent and child images, images that are in the same generational line can be built in any order, i.e. two children of the same parent can be built in either order, as long as the parent is built before the children.

In one embodiment, the performing of a hashing function on the image to produce a checksum includes accessing contents of a directory including the image and including the accessed contents with the image on which the hash function is performed. Similarly, the performing of a hashing function on the image to produce a checksum includes, for instance, acquiring a name of a parent image for the image and including the acquired parent name with the image on which the hash function is performed. The hashing process comprises the operation of a hashing function on an image to produce a checksum. However, additional component(s) can be included in the hashing process and the hashing function can operate on the image plus information, such as the directory contents and the name of the image parent. Thus, changes outside the image itself can then be detected, as this may be useful to catch indirect changes that could nevertheless affect the image being built. This provides additional levels of protection to ensure that images that should be rebuilt and not reused are actually rebuilt.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
  selecting, by a processor, an image to be built;
  performing a hashing function on the image to produce a checksum;
  querying a registry for an existing image including a same checksum; and
  based on no existing image including the same checksum being found:
    acquiring a parent image for the image to be built;
    building the image to produce a built image;
    adding the checksum for the image to the built image; and
    storing the built image in the registry.

2. The computer-implemented method according to claim 1, further comprising adding a build label for the image to the built image.

3. The computer-implemented method according to claim 1, further comprising receiving a set of images to be built, the set of images comprising a hierarchy of parent and child images where each child image has a single parent image, and ordering the set of images for processing such that each parent image is processed prior to the children of the respective parent image.

4. The computer-implemented method according to claim 1, wherein the performing the hashing function on the image to produce the checksum includes accessing contents of a directory including the image and including the accessed contents with the image on which the hash function is performed.

5. The computer-implemented method according to claim 1, wherein the performing the hashing function on the image to produce the checksum includes acquiring a name of a parent image for the image and including the acquired parent name with the image on which the hash function is performed.

6. A computer system comprising:
  a memory; and
  a processor in communication with the memory, wherein the computer system is configured to perform a method, said method comprising:
    selecting, by the processor, an image to be built;
    performing a hashing function on the image to produce a checksum;
    querying a registry for an existing image including a same checksum; and
    based on no existing image including the same checksum being found:
      acquiring a parent image for the image to be built;
      building the image to produce a built image;
      adding the checksum for the image to the built image; and
      storing the built image in the registry.

7. The computer system according to claim 6, wherein the method further comprises adding a build label for the image to the built image.

8. The computer system according to claim 6, wherein the method further comprises receiving a set of images to be built, the set of images comprising a hierarchy of parent and child images where each child image has a single parent image, and ordering the set of images for processing such that each parent image is processed prior to the children of the respective parent image.

9. The computer system according to claim 6, wherein the performing the hashing function on the image to produce the checksum includes accessing contents of a directory including the image and including the accessed contents with the image on which the hash function is performed.

10. The computer system according to claim 6, wherein the performing the hashing function on the image to produce the checksum includes acquiring a name of a parent image for the image and including the acquired parent name with the image on which the hash function is performed.

11. A computer program product comprising:
a computer readable storage medium readable by a processing circuit and storing instructions for execution by the processing circuit for performing a method comprising:
selecting, by a processor, an image to be built;
performing a hashing function on the image to produce a checksum;
querying a registry for an existing image including a same checksum; and
based on no existing image including the same checksum being found:
acquiring a parent image for the image to be built;
building the image to produce a built image;
adding the checksum for the image to the built image; and
storing the built image in the registry.

12. The computer program product according to claim 11, wherein the method further comprises adding a build label for the image to the built image.

13. The computer program product according to claim 11, wherein the method further comprises receiving a set of images to be built, the set of images comprising a hierarchy of parent and child images where each child image has a single parent image, and ordering the set of images for processing such that each parent image is processed prior to the children of the respective parent image.

14. The computer program product according to claim 11, wherein the performing the hashing function on the image to produce the checksum includes accessing contents of a directory including the image and including the accessed contents with the image on which the hash function is performed.

15. The computer program product according to claim 11, wherein the performing the hashing function on the image to produce the checksum includes acquiring a name of a parent image for the image and including the acquired parent name with the image on which the hash function is performed.

* * * * *